United States Patent [19]

Zolman

[11] 4,250,419
[45] Feb. 10, 1981

[54] HOLDER FOR OVERLOAD PROTECTOR

[75] Inventor: Charles T. Zolman, Zeeland, Mich.

[73] Assignee: General Electric Company, Fort Wayne, Ind.

[21] Appl. No.: 347,073

[22] Filed: Apr. 2, 1973

[51] Int. Cl.³ .......................................... H02K 11/00
[52] U.S. Cl. .............................. 310/68 C; 174/138 F; 310/71
[58] Field of Search .................... 310/68 R, 68 C, 71; 337/112, 380; 318/478; 229/36, 25, DIG. 8; 2/340; 174/138 F

[56] References Cited

U.S. PATENT DOCUMENTS

| 943,976 | 12/1909 | Kornreich | 2/340 |
|---|---|---|---|
| 2,177,993 | 10/1939 | Olsen | 229/DIG. 8 |
| 3,019,958 | 2/1962 | Asman et al. | 229/36 X |
| 3,130,479 | 4/1964 | Pleiss, Jr. | 310/68 R X |
| 3,135,883 | 6/1964 | Phillips | 310/68 R |
| 3,246,183 | 4/1966 | Slonneger | 310/68 R |
| 3,515,917 | 6/1970 | Kolb | 310/71 |
| 3,842,297 | 10/1974 | Pleiss, Jr. et al. | 310/71 X |

*Primary Examiner*—Robert J. Hickey
*Assistant Examiner*—Harry E. Moose, Jr.
*Attorney, Agent, or Firm*—Ralph E. Krisher, Jr.

[57] ABSTRACT

Protector accommodating pocket established by a sheet of dielectric material which is folded upon itself. Includes locking flap having an accurately located entry hole for spade type terminal. Locking shoulder is established by the flap to securely lock a protector in the pocket. A solid segment, interrupted only by a lanced portion provides maximum strength against inadvertant release of the terminal. The assembled member preferably is ultrasonically spot welded and may include a reinforcing member.

31 Claims, 7 Drawing Figures

HOLDER FOR OVERLOAD PROTECTOR

BACKGROUND OF THE INVENTION

The present invention relates to a holder for thermoresponsive means; and more particularly, to a fabricated member adapted to be disposed in intimate relationship with windings of a dynamoelectric machine, and to dynamoelectric machines including a fabricated member that is especially adapted to accommodate devices of the type generally referred to as motor overload protectors.

Extensive work has been done heretofore in connection with providing dynamoelectric machine mounting arrangements for thermoresponsive devices such as overload protectors. For example, Dubberley U.S. Pat. No. 2,909,719 illustrates an approach wherein a metal strip or fin is in heat exchange contact with the casing of motor protective means such as a thermally responsive switch. The metal strip or fin of Dubberley preferably is placed between overlapping or adjacent portions of first and second motor windings. This same Dubberley patent teaches that insulation in the form of paper or other suitable thin dielectric sheet material may be provided between the metal strip or fin and winding portions adjacent thereto.

Pleiss, Jr., et al U.S. Pat. No. 3,131,322 (which issued Apr. 28, 1964) illustrates still another approach for disposing overload protector means in heat transfer relationship to the end turns of a motor winding. With this approach, an overload protector is accommodated in a pocket formed by a V-shaped piece of metal foil. The metal foil in turn, is disposed between adjacent winding portions, with a V-shaped insulator (formed e.g., of cellulose acetate, or MYLAR material), separating the metal foil and the winding portions adjacent thereto.

With subsequent development of the motor protector mounting art, it has been suggested that economies in the manufacture of motor stators could be accomplished by eliminating the metal foil pocket members used before, and rely instead upon dielectric sheet material to establish a pocket for a motor protector. In order to eliminate the requirement that the motor protector be tied in place in the pocket established therefore; it has also been suggested to provide a dielectric material that could be used to lock against a spade type terminal of such protector. This tab then could be relied upon to hold the protector in place.

One variation from the above is to include a dielectric material flap that is folded and positioned to establish a layer of dielectric material between the stator winding and the interconnected portions of windings and external conductors. This dielectric material flap is now of a size and shape to permit it to be folded back over such interconnected portions. Cord or twine may then be tied about the folded over flap. With this arrangement, the flap then also provides extra protection against pulling the lead wires loose from the stator windings.

Heretofore, means such as lacing or tying cord have been relied upon to hold external lead wires in a desired position relative to the winding turns and separate sheets of dielectric material have been used to provide the desired insulation between conductor connections and winding end turns.

I have found that the various approaches suggested by others as described above have certain shortcomings. Accordingly, I have devised a new and improved arrangement that is economical to manufacture, and yet is believed to be extremely reliable in practice. For example, in other approaches, the insulating material seems to easily crack or break at the corners of holes formed therein that receive a protector.

Accordingly, it is an object of the present invention to provide new and improved structural means whereby improved protection against tearing of such pockets is provided.

Locking tabs provided previously have not always securely locked a protector in place and, in at least some instances, the location of entry and or locking apertures have not always been precisely located so as to properly lock a protector in place. Accordingly, another object is to provide an improved protector receptacle having an improved locking flap arrangement so that the advantages of quick assembly may be obtained and yet maximum locking strength also be established and maintained.

Still another object is to provide a uniquely contoured surface that establishes an entry hole for a fabricated, dielectric material protector holder; and yet protects against breaking of the dielectric material at the corners while providing and maintaining a snug fit of a protector disposed in such hole.

Still other objects are to provide closing tabs, and reinforcing means, in a fabricated, dielectric material, protector holder.

SUMMARY OF THE INVENTION

In carrying out the above and other objects of the invention, in one form thereof, I provide a dynamoelectric machine having a protector accommodating pocket that is established by a sheet of dielectric material which is folded upon itself. In a preferred form, the pocket forming dielectric material includes a locking flap having an accurately located entry hole through which a spade type terminal of a protector may enter. A locking shoulder is established by the flap, by means of which the protector may be securely and reliably locked in the pocket. The locking flap entry and locking openings are separated by a substantially solid segment of dielectric material, and the continuity of such solid segment is interrupted by a lanced portion that yields during locking of the flap over the protector terminal, yet provides maximum strength against inadvertent release of the terminal. Particularly contoured protector receiving openings, flaps along preselected portions of such openings, and smooth fold inducing openings, among other things, also are provided.

In another illustrated structure embodying the invention, I have provided a dielectric material reinforcing member that may be folded within the sheet which forms the protector pocket. The fabricated protector receiving pocket is held in assembled relationship preferably by means of ultrasonically welded regions. The ultrasonic welding approach also, preferably, is utilized when a reinforcing member is included.

The subject matter which I regard as my invention is particularly pointed out and distinctly claimed in the concluding portion of this specification. The invention, itself, however, both as to its organization and method of operation, together with further objects and advantages thereof may be better understood by reference to the following description taken in connection with the accompanying drawings.

BRIEF DESCRIPTION OF THE DRAWINGS

FIG. 1 also showing an exemplary overload protector positioned for entry into the pocket of such member of dielectric material;

DESCRIPTION OF THE PREFERRED EMBODIMENTS

Figure 1:
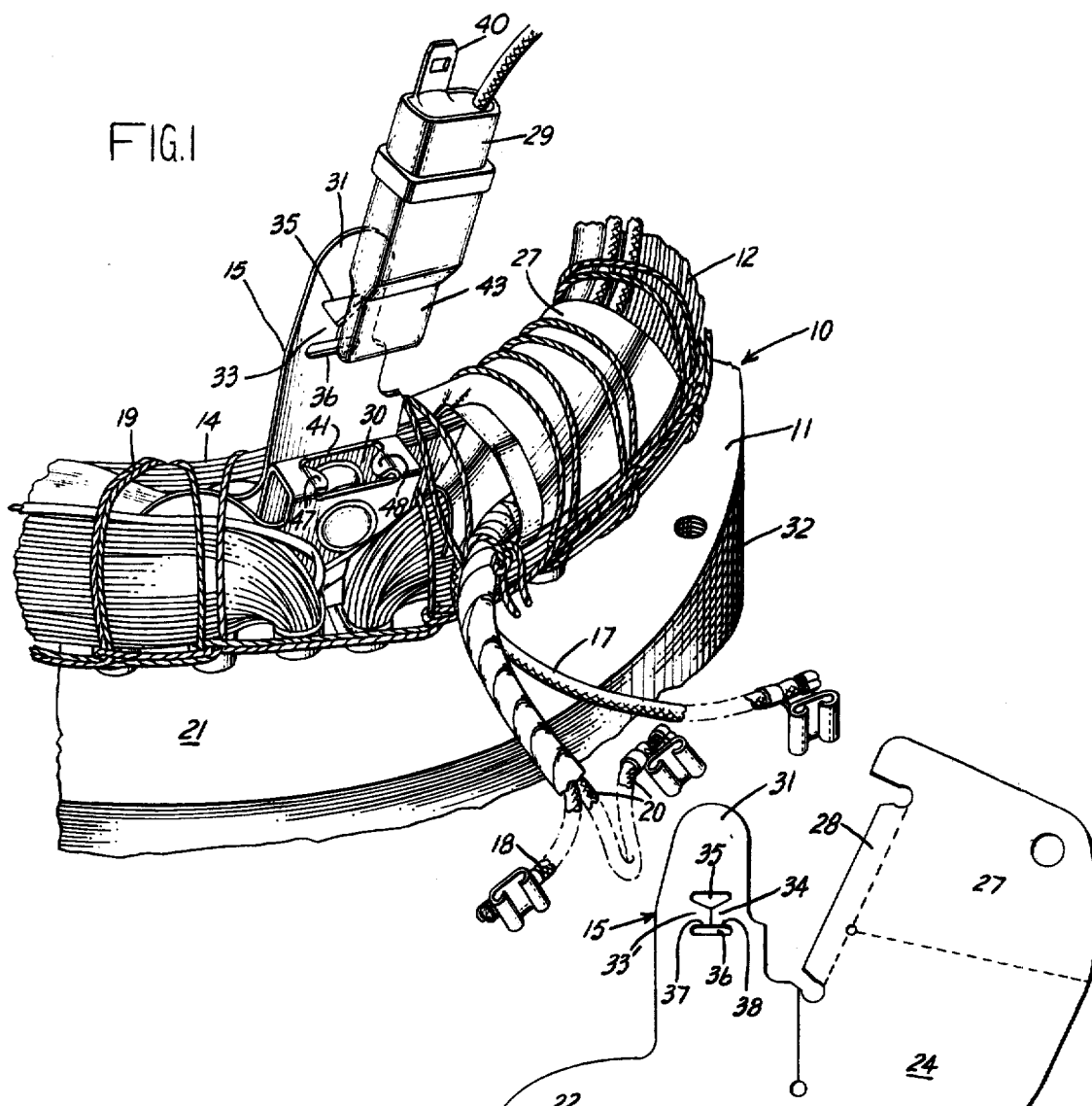
FIG. 1 is a perspective view, with parts removed and parts broken away, of a wound stator assembly that includes an overload protector pocket defining member and embodying the invention in one form thereof.

Turning now to the drawings, I have there illustrated a stator assembly 10 of the type particularly adapted for use in hermetically sealed compressor units. More specifically, the assembly 10 includes a core 11, main windings 12, auxiliary windings 14, a protector pocket establishing member 15, and external lead wires 17, 18, and 20. It will be observed from FIG. 1 that the end turn portions of the windings are bound or tied together with cord. The actual tying or placing of cord 19 may be done with lacing equipment of the type shown and described, for example, in Mason U.S. Pat. No. 3,659,337 which issued May 2, 1972.

During manufacture of the stator assembly 10 (prior to tying the winding end turns), the pocket defining member 15 (see FIG. 3) is slipped into place between the end turn bundles of the windings 12, 14. This may be accomplished by positioning the member 15 above the windings and then manually pushing the member 15 downwardly between the windings toward the face 21 of the core. If desired, a thin blunt tool (for example, a thin steel blade) may be pushed between the two flat portions 22, 23 and 24, 26 of the member 15 (see FIG. 3). In this manner, the member 15 may be seated in a desired position relative to the windings 12 and 14.

Thereafter, a flap 27 (as will be described in more detail hereinafter) is pulled up and over connections between the lead wires 17, 18, and 20. Then, the cord 19 is laced around the end turns and flap 27 to tightly bind together the winding end turns, pocket establishing member 15, and other structural components all as is clearly revealed in FIG. 1 of the drawings.

Subsequently, a thermal protector such as the one denoted by the numeral 29 is pushed into the pocket 30, and locking flap 31 is pulled outwardly away from the bore of the stator core towards the outer surface 32 thereof so that the spade type terminal 40 of protector 29 enters opening 35 of the locking flap or tab 31. A slight pull or tug on flap 31 then will cause the locking ears 33', 34 (see FIG. 3) to separate along the lanced portions thereof so that the locking opening 36 traps the terminal 40. Shoulders 37, 38 of locking ears 40, 34 then prevent inadvertent release of the terminal 29 by flap or tab 31.

Figure 2:
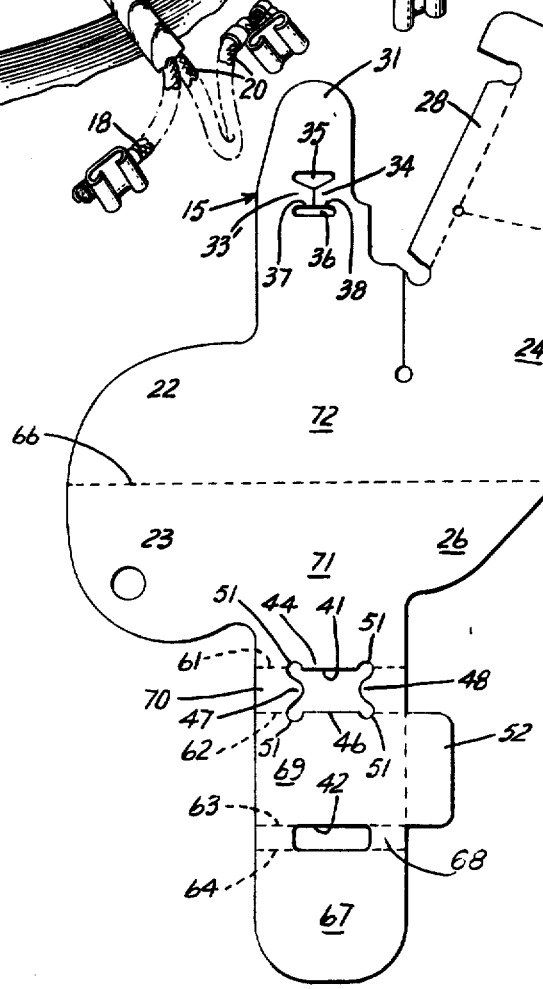
FIG. 2 is a layout of a sheet material blank used to fabricate the pocket forming member of FIG. 1.
Figure 3:
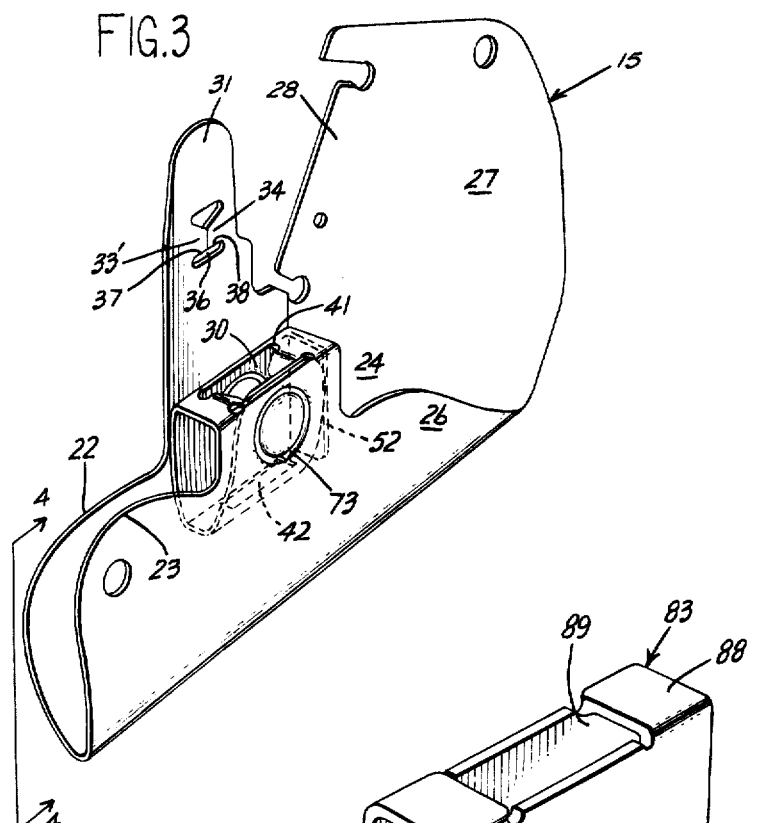
FIG. 3 is a view in perspective of the pocket forming member of FIG. 1.

Turning now to FIGS. 2 and 3, the pocket establishing member 15 will be described in more detail. It will be understood that numerous different types of dielectric sheet material could be used to form the member 15. For example, any suitable commonly used electrical insulating paper could be used. By way of specific example, nylon paper, one commercial form of which is marketed under the name NOMEX, could be used. Another suitable material (and one that I have used to fabricate members 15) is a laminated sheet of polyester materials which is marketed by E. I. du Pont de Nemours & Co. as D-M-D (Dacron-Mylar-Dacron) mat or sheet. The D-M-D material is a laminate of Du Pont's Dacron and Mylar materials. In fabricating members 15, I used eleven (11) mil thick sheet material which comprised a five (5) mil thick center layer of Mylar material sandwiched or laminated between two three (3) mil outer layers of Dacron material.

Member 15, shown best in FIG. 3, is fabricated from a dielectric sheet material blank that is best shown in FIG. 2. The blank is provided with a first flap having a pair of openings therein, the openings being denoted by the numerals 41 and 42, respectively. Opening 41 establishes an entry opening for the leading end 43 of a protector such as the one illustrated in FIG. 1. After the first flap is folded (see FIG. 3), opening 42 underlies opening 41 and is aligned therewith. The web of material which separates openings 41 and 42 is secured (as will be more fully described hereinafter), to the folded body of the blank so as to maintain alignment of holes 41 and 42 (see FIGS. 3 and 4).

Referring now again to FIG. 1, the leading end 43 of the protector 29 is admitted through entry opening 41 and positioned so that the protector end 43 will project through opening 42. Locking flap 31 then may be pulled down over the protector so as to latch or lock terminal 40 in the locking opening 36.

Entry opening 41 is defined by relative straight edges 44, 46 and also by surfaces of entry flaps 47, 48. Entry flaps 47, 48 flex or yield when a protector is placed in the pocket 30. The flaps 47, 48 provide an increased bearing surface against which the protector body will bear. This prevents cracking or tearing of the sheet material when forces are applied which tend to rock the protector sideways against the flaps 47, 48. These flaps also yield to promote entry of a protector into pocket 30 and yet snugly support a protector that is positioned in the pocket. It will be understood that entry flaps 47, 48, tend to spring toward their unfolded position (as shown in FIG. 2 for example) and thus will provide a centering effect on a protector within pocket 30. Thus, the entry flaps insure that a protector will be held in the pocket with a snug but nonetheless slip fit. It will be appreciated, that if means such as entry flaps 47, 48 were not utilized, and opening 41 was precisely dimensioned to provide a snug fit for a protector having a nominal size, one given protector might fit loosely in pocket 30, while another given protector might fit so tightly as to crack or break the material around hole 41.

Undercut corners 51 further protect against breaking or cracking of sheet material around hole 41 when a protector is forced thereinto as well as after final positioning of a protector in pocket 30.

Dotted or dashed lines have been applied to the blank shown in FIG. 2 to represent lines along which the blank is folded during fabrication of member 15. Dotted lines have not been applied for this purpose in FIG. 3, because phantom lines are used in FIG. 3 only to illustrate the location of opening 42, closure flap 52, and other details of member 15 that otherwise are hidden from view in FIG. 3.

With brief reference to FIGS. 1 and 3, a pocket closure flap 52 prevents inadvertent or undesired contact between one or more segments of the windings with the body of the protector 29.

In the fabrication of members such as the illustrated member 15, it is convenient to use a fixture having a shape that at least roughly corresponds to the shape of the protector 29. Such fixture is inserted partway into the opening 41 of the blank shown in FIG. 2. The blank then is folded along lines 61, 62; and along the fold lines 63, 64 so that opening 42 is aligned with the free extremity of the assembly fixture. At that time, I effect relative movement between the fixture and the partly folded blank (for example by sliding the blank along the fixture until the free end of the fixture protrudes through the opening 42); and then fold the blank along the fold line 66. At this point in the assembly sequence, the relative positions of the segment or web 69 and segments 67, 68, 70, 71, and 72 of the member 15 will be generally as shown in FIG. 4.

Figure 4:
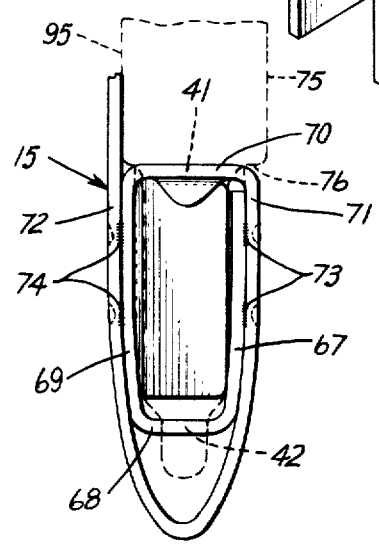
FIG. 4 is an end view, with parts broken away and parts removed, of the member shown in FIG. 3, FIG. 4 being a view taken in the direction of the arrows 4—4 in FIG. 3, and also showing, in phantom, parts of an assembly fixture.

In FIG. 4, I have illustrated, with phantom lines, a portion of an assembly fixture 75 in the position thereof relative to member 15 that will exist after the member 15 has been fabricated. It will be understood that the free end of the fixture 75 may be inserted through opening 41 or that the blank may, itself, be moved onto the fixture. It is convenient for the fixture 75 to be utilized as part of an ultrasonic welding set-up while the member 15 is welded together in the regions 73, 74.

The accurate final alignment and position of locking hole 36 relative to the pocket 30 in member 15 is relatively difficult to maintain. However, the maintenance of a predetermined dimensioned relationship between the pocket and hole 36 is extremely important. After a protector has been inserted into pocket 30, it is necessary that entry means, such as a lanced region, slit, or hole 35 readily accept a protector terminal and that the location of locking opening 36 relative to the terminal be such that the terminal is reliably locked in place in pocket 30.

I can precisely locate locking hole 36 relative to pocket 30 by providing one or more pins on fixture 75. Hole 36 in the locking flap 31 then is positioned over such pins prior to welding the member 15. For example, with a fixture 75 contoured to at least approximately correspond to the shape and configuration of a protector, the fixture is positioned between the section 67 and web or section 69 of member 15 (see FIG. 4). The entry opening 35 or locking opening 36 may be held in position by one or more pins that protrude from the face 95 of the fixture 75 while segment 70 of the blank is held against a sholder 76 of the fixture 75. This predetermined location of the locking opening is then permanently established when the member 15 is welded at the regions 73 and 74.

After regions 73 and 74 have been ultrasonically welded, flap 31 is removed from the locating means on the fixture, the assembled member 15 is separated from the fixture, and it may then be inserted between windings 12 and 14 (see FIG. 1).

Member 15 may be ultrasonically welded first on one side and then on the other side. This may be done, for example, by welding the region 73 against the fixture 75; and then repositioning the fixture and a welding tip that is powered by a conventional, commercially available, ultrasonic welding power supply. It is to be specifically noted that both sides of the device 15 may be welded substantially simultaneously so as to effect a substantial savings in time. However, when this is done, I have found it to be more preferable to use a different type of weld than that represented at regions 73 and 74.

Regions 73 and 74 represent welds that were made using a cylindrical welding tool that had a welding diameter of approximately 7/16ths of an inch. The welding tool had a non-solid welding tip so that a circular weld bead of about 7/16ths of an inch in diameter was formed. I have found, that if this type of weld is used, it is necessary to utilize substantial amounts of excitation energy for the welding tips in order to perform the welding operation. Moreover, I have found that at least about five seconds actual welding time is required to form each of the welds 73 and 74 in the 3-5-3 D-M-D material. In addition, a conventional power supply that I used had capacity to power only one such welding tip at a time.

However, when I used a solid welding tip formed from one-quarter inch round solid rod, the same power supply could energize two solid welding tips at the same time, and simultaneously accomplish both welds within about one second. Thus, by using the simultaneous solid spot welding approach, I can weld both sides of the member simultaneously in about one second and use only approximately the same total energy that previously was used. By welding both sides simultaneously, I also reduce the total fabrication time by eliminating the need to physically reorient a fixture and welding head so as to sequentially weld first region 73 and then region 74.

As has been indicated above, the member 15 is formed of a laminated material having a total thickness of about 11 mils. It therefore will be appreciated, when viewing FIG. 4, that the sides of a thermoprotector disposed against the portions 67 and 69 of member 15 will be separated from motor windings by two layers of dielectric material (e.g., layers 67 and 71 on one side, and layers 69 and 72 on the other side). Since the material from which member 15 is made is a total of 11 mils thick, this will provide a total thickness of about 22 mils of material separating a protector from windings adjacent thereto.

For some applications however, it is desirable for an even greater thickness of material to separate the protector from the windings. One solution for this would be to use a thicker sheet of dielectric material. For example, a three-ten-three D-M-D mat (meaning a three mil, ten mil, three mil, laminated layer of Dacron-Mylar-Dacron materials) could be used. Then, when such thicker material were folded into the configuration represented by FIGS. 3 and 4, a total thickness of 32 mils of dielectric material would separate a protector from windings adjacent thereto. However, 3-10-3 mil D-M-D materials have a total thickness of 16 mils, and are much less readily worked than the material from which member 15 is formed. Of course, such substantially thicker material also is more expensive.

Figure 5:
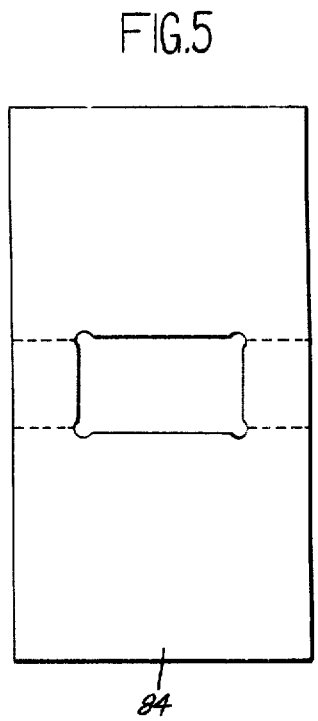
FIG. 5 is a view of a sheet material blank used to form a secondary or reinforcing member.
Figure 6:
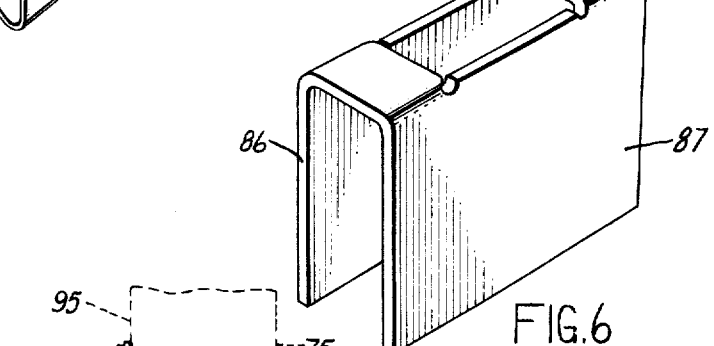
FIG. 6 is a view in perspective of a reinforcing member formed from the blank shown in FIG. 5.
Figure 7:
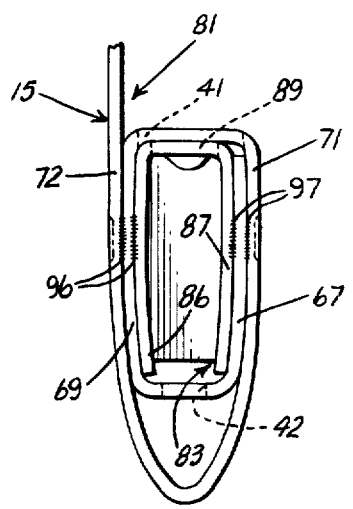
FIG. 7 is an end view generally corresponding to FIG. 4 but showing an assembly of a pocket forming member substantially identical to the one of FIG. 3, and the reinforcing member shown in FIG. 6.

By utilizing structures as illustrated in FIG. 5, I can provide a member corresponding generally (with variations as will be now described) to the structure 15 and yet that will provide an increased amount of dielectric separation between a protector and windings adjacent thereto. The member 81 of FIG. 7 is formed of the same material as the member 15 of FIG. 3. In fact, member 81 includes essentially two parts; a first part being a pocket forming member 15 which, before being folded, corresponds identically to the unfolded blank shown in FIG. 2. However, a secondary member 83 also is used, the secondary member 83 being shown in perspective in FIG. 6.

The member 83 is folded from a blank or flat piece 84 of material that has been shown in its unfolded configuration in FIG. 5 where dotted lines have again been used to represent fold lines. Although blank 84 has been shown to an enlarged scale as compared to FIG. 2, the material blank 84 may actually be salvaged from what otherwise would be a scrap portion of the elongated strip of material from which the blank for member 15 is stamped.

The secondary member 83, once it has been assembled with member 15, will be generally C-shaped and have a pair of legs 86, 87 depending from a bite portion 88. The bite portion has a protector admitting opening 89 formed therein. The legs 86 and 87 provide a reinforcing effect for the sides of the pocket that is established between the sidewalls 67, 71, and 69, 72 of member 15.

It is also to be noted that when the dielectric material is stamped to form the sheets or strips from which the members 15 and the secondary member 83 is formed, it is preferable to crease or score the material along the intended fold lines. This facilitates later folding of the dielectric material during fabrication of the members 15 and 81.

In the actual assembly of a structure as shown in FIG. 7, I have found it most convenient to slip the blank for member 15 onto a welding fixture (e.g., fixture 75). I then slip the blank 84 onto the fixture. Thereafter, I fold the sections 67 and 69 over the fixture, at the same time folding a leg 86 of member 83. I then fold the section 71 and leg 87; and tuck the section 67 between leg 87 of member 83 and section 71 of member 15. As the folding procedure is completed, both pieces of material are slipped completely onto the fixture 75 so as to abutt against the locating shoulder 76. At that time, the locking flap 31 of the member 15 is fastened onto latching means, for example as above described, and the substantially solid spot welds 96, 97 are simultaneously completed.

After member 15 or member 81 has been placed between the windings 12, 14, portion 24 is pulled down toward face 21 of core 11 and the interconnected portions of the windings and leads 17, 18, and 20 are laid thereagainst. Portion 27 of the connection covering flap then is folded over such interconnections and laced or tied in place with cord 19.

The entire stator assembly may subsequently be shipped to a different location where a protector is positioned in pocket 30. At this time, flap 31 is locked onto the terminal of a protector and a quick connect terminal on one of the winding leads 17, 18, or 20 may be slipped onto a spade terminal of the protector. One or more leads from the protective device may then be used for power connection purposes.

It should be noted that, while an entry hole has been shown, the extent of the lancing (which extends from locking hole 36) could be made greater so as to promote entry of a terminal thereinto. It also should be specifically noted that the assembly 10 may be used wherever desired, but that it may be of particular use in hermetically sealed motor applications. Moreover, since such motors are generally well known in the art, further specific description thereof has not been presented herein. However, an exhaustive description of such motors is presented in B. B. Hull U.S. Pat. Nos. 3,490,143 and U.S. Pat. No. Re. 26,788 which issued on Jan. 20 (1970) and Feb. 10 (1970) respectively, and the disclosures of which are specifically incorporated herein by reference.

It should now be appreciated, that the invention described herein may be utilized in practice to reliably and economically overcome the problems mentioned hereinabove and to accomplish the objects set out hereinabove.

Therefore, while in accordance with the Patent Statutes, I have described what at present are considered to be preferred forms of the invention, it will be obvious to those skilled in the art that numerous changes and modifications may be made therein without departing from the true spirit and scope of the invention. It therefore is aimed in the following claims to cover all such modifications.

What I claim as new and desire to secure by Letters Patent of the United States is:

1. A member for establishing a motor protector receiving pocket, said member being formed from a dielectric sheet material blank having a body portion and at least first and second flap portions extending in generally opposite directions from the body portion; a first one of the flap portions having first and second holes therein spaced apart and separated by a web of dielectric material; the first one of the flap portions being folded adjacent to each of the first and second holes therein with said web of dielectric material positioned against said body portion; and the second one of the flap portions having a terminal locking hole formed therein with the terminal locking hole being substantially totally surrounded by dielectric sheet material; a section of said dielectric sheet material immediately adjacent to the terminal locking hole being lanced along a line extending from the locking hole; the lanced section of sheet material being yieldable to permit relative movement between a protector terminal and the locking hole along said line; the sheet material adjacent to the locking hole and on each side of said line forming locking ears for retaining a protector terminal trapped in the locking hole; and wherein the first and second flap portions of said member are secured together by at least one ultrasonic weld.

2. The structure of claim 1 wherein a terminal entry hole is provided in the second one of the flap portions, and the dielectric sheet material is lanced along a line between the entry and locking holes so that two adjacent portions of sheet material may be separated along such line.

3. The structure of claim 1 wherein the member includes a secondary reinforcing member having at least one leg positioned adjacent to said web of dielectric material.

4. The structure of claim 3 wherein the reinforcing member comprises a folded sheet of dielectric material having a bite portion with an opening therein that is aligned with at least one of the holes in the first one of the flap portions; said reinforcing member including two legs extending from said bite portion.

5. The structure of claim 1 wherein at least one of the holes in the first flap portion is at least partly defined by deflectable flaps of dielectric material.

6. The structure of claim 1 wherein the member includes a folded closure member extending along said web.

7. A pocket establishing member for a motor protector formed of dielectric sheet material having at least one flap portion having a terminal locking hole formed therein; said member defining at least one protector admitting hole and said member including a body of dielectric sheet material having at least one folded portion, with part thereof spaced from the at least one flap portion so as to accommodate a protector therebetween, with a folded portion of said body of dielectric sheet material being positioned in overlapping relation with part of the at least one flap portion; said folded portion and the material defining the at least one flap portion being ultrasonically welded together.

8. The structure of claim 7 wherein at least one of the holes in said first flap portion is generally rectangular and the corners of the at least one of the holes are undercut.

9. The structure of claim 7 wherein the member includes a connection covering flap extending from the body of said member.

10. A pocket establishing member for a motor protector, said member comprising a body of dielectric sheet material having at least one flap portion having a terminal locking hole formed therein; said body of sheet material having at least one protector admitting hole therein and said body of dielectric sheet material being folded so that the portion of material defining the at least one flap portion is positioned in overlapping relation with another portion of the sheet material; said another portion of the sheet material and the material defining the at least one flap portion being ultrasonically welded together.

11. The pocket establishing member of claim 10 wherein the terminal locking hole is substantially totally surrounded by dielectric sheet material; and a section of said dielectric sheet material immediately adjacent to the terminal locking hole is pierced along a line extending from the locking hole without removal of material; the pierced material being yeildable to permit relative movement between a protector terminal and the locking hole along said line; the sheet material adjacent to the locking hole and on each side of said line forming locking ears for retaining a protector terminal in the locking hole.

12. A method for fabricating a member, having a pocket for a motor protector having a body of a first general shape, from dielectric sheet material, the method comprising: forming a dielectric sheet material blank having a desired layout and having first and second segments, with the first segment having first and second openings separated by a web of material; folding the blank at least generally along at least two fold lines and moving the first and second openings relative to one another toward a mutually aligned relationship; relatively moving at least part of the blank and a fixture having a free extremity and having a portion with a shape that at least roughly corresponds to the above mentioned first general shape so that a first portion of the fixture is disposed in the first opening of the blank and the free extremity of the fixture protrudes through the second opening of the blank; holding spaced apart regions of the blank in relative positions adjacent to opposite sides of the fixture, with the sheet material folded upon itself so that the web of material is adjacent to a predetermined portion of the second segment, and so that a first portion of material that is located between the second opening, and an extremity of the first segment is positioned adjacent to a second portion of the first segment that is located between the first opening and the second segment, and ultrasonically welding together at least the first portion of material and the second portion of the first segment, and at least the web of material and the predetermined portion of the second segment.

13. The method of claim 12, wherein the first portion of material and the second portion of the first segment, and the web and the predetermined portion of the second segment, are substantially simultaneously welded.

14. The method of claim 12, wherein ultrasonically welding includes welding at least one circular weld bead.

15. The method of claim 12, wherein ultrasonically welding includes welding at least one solid spot weld.

16. A method of fabricating a member, having a pocket for a motor protector having a body of a first general shape, from dielectric sheet material, the method comprising: forming a dielectric sheet material blank having a desired layout; scoring the blank along a number of predetermined fold lines so that a first segment of sheet material extends in a first direction from a first fold line to an extremity thereof with the first segment of sheet material having first and second openings separated by a web of material, and so that a second segment of sheet material extends from the first fold line in a direction opposite to the first direction; folding the blank at least generally along at least some of the fold lines and moving the first and second openings relative to one another toward a mutually aligned relationship, relatively moving at least part of the blank and a fixture having a free extremity and having a portion with a shape that at least roughly corresponds to the above mentioned first general shape so that a first portion of the fixture is disposed in the first opening of the blank, and the free extremity of the fixture protrudes through the second opening of the blank; holding spaced apart regions of the blank in relative positions adjacent to opposite sides of the fixture, with the sheet material folded upon itself so that the web of material is adjacent to a predetermined portion of the second segment, and so that a first portion of sheet material, that is located between the second opening and the extremity of the first segment, is positioned adjacent to a second portion of the first segment that is located between the first opening and the second segment; and ultrasonically welding together at least the first portion of material and the second portion of the first segment.

17. The method of claim 16 further comprising welding together the web and the predetermined portion of the second segment.

18. The method of claim 17 comprising substantially simultaneously welding the first portion of material and the second portion of the first segment, and the web and the predetermined portion of the second segment.

19. The method of claim 16 wherein ultrasonically welding includes welding a circular weld bead in the first portion of material.

20. A method of fabricating a member, having a pocket for a motor protector having a body of a first general shape, from a dielectric sheet material blank having a desired layout and including first and second protector body receiving openings and a third opening for receiving a protector terminal, and having first and second segments with at least the first and second openings located in the first segment and separated from one another by a web of material; the method comprising: folding the blank at least generally along at least two lines and moving the first and second openings relative to one another toward a mutually aligned relationship; relatively moving at least part of the blank and fixture means having a free extremity, latching means for interfitting with the third opening, and a portion that at least roughly corresponds to the above mentioned first general shape, so that a first portion of the fixture is disposed in the first opening of the blank and the free extremity of the fixture protrudes through the second opening of the blank; interfitting the latching means and the third opening so as to precisely locate the third opening relative to the fixture means; holding at least two spaced apart regions of the blank in overlapped relation adjacent to the fixture means, ultrasonically welding together at least the two spaced apart and overlapped regions of the blank; removing the third opening from the latching means; and separating the member from the fixture means.

21. A method of fabricating a member, having a pocket for a motor protector having a body of a first general shape, from dielectric sheet material wherein a first portion of sheet material has two spaced apart protector terminal accommodating openings that are separated by a lanced section of the sheet material; the method comprising: folding another portion of sheet material and positioning said another portion adjacent to said first portion of sheet material; and ultrasonically welding together the first and another portions of sheet material.

22. The pocket establishing member of claim 10 wherein the another portion of the sheet material and the material defining the at least one flap portion are ultrasonically welded together along a circular weld bead.

23. The pocket establishing member of claim 10 wherein the body of dielectric material is folded so that a pocket is established for a motor protector; the pocket being defined at two opposite sides thereof by a first at least two layers of dielectric sheet material and by a second at least two layers of the dielectric sheet material; said first at least two layers of dielectric sheet material being ultrasonically welded together and said second at least two layers of the dielectric sheet material being ultrasonically welded together.

24. The pocket establishing member of claim 23 wherein the ultrasonically welded portions of the sheet material hold a precision location of the terminal locking hole relative to the pocket.

25. The pocket establishing member of claim 23 wherein the ultrasonically welded portions of the sheet material are each established by substantially circular weld beads.

26. The pocket establishing member of claim 23 wherein the ultrasonically welded portions of the sheet material are each established by substantially solid spot welds.

27. A pocket establishing member for a motor protector, said member comprising a body of dielectric sheet material having at least one flap portion having a terminal locking hole formed therein; said member including dielectric sheet material folded to establish at least part of a pocket for accommodating a motor protector; the pocket being located between first and second overlapped portions of dielectric sheet material; each of the first and second overlapped portions of the sheet material comprising at least two layers of the sheet material; and the at least two layers of the sheet material at each of the first and second overlapped portions being ultrasonically welded together.

28. A receptacle adapted for insertion within electrical windings to secure a sensing element therein and insulate the element from the windings, comprising first and second portions of sheet-like flexible material disposed relative to one another so that the first and second portions extend laterally with respect to each other, said first portion having at least a pair of folded portions that at least partly define a pocket for a sensing element; said first and second portions of the flexible material being ultrasonically welded together.

29. A receptacle adapted for insertion within electrical windings to secure a sensing element therein and insulate the element from the windings, said receptacle being formed from first and second portions of sheetlike flexible material disposed so that the first and second portions are oppositely located and extend laterally with respect to each other, said first and second portions being ultrasonically welded together whereby the geometrical relationship of the first and second portions is permanently established.

30. The receptacle of claim 28, wherein said sheetlike flexible material consists of an electrical insulating laminate formed by layers of Dacron and Mylar.

31. A receptacle adapted for insertion within electrical windings to secure a sensing element therein and insulate the element from the windings, comprising a sheetlike flexible material disposed in a folded position to provide oppositely located first and second portions extending laterally with respect to each other, said first portion having at least a pair of spaced folds adjacent the outer end thereof and a pair of spaced openings extending generally parallel to said folds and in substantially the same plane to receive the sensing element in said openings and means securing the first and second portions of the receptacle in the folded position, wherein said securing means includes an ultrasonic weld between said first and second portions.

* * * * *